ELECTRONIC HUB TYPE TELEGRAPH REPEATER

Filed Oct. 27, 1948

INVENTOR
W. T. REA
BY John E. Cassidy
ATTORNEY

Patented June 26, 1951

2,558,197

UNITED STATES PATENT OFFICE 2,558,197

ELECTRONIC HUB TYPE TELEGRAPH REPEATER

Wilton T. Rea, Manhasset, N. Y., assignor to Bell Telephone Laboratories, Incorporated, New York, N. Y., a corporation of New York Application October 27, 1948, Serial No. 56,819

12 Claims. (Cl. 178—73)

Figure 1:
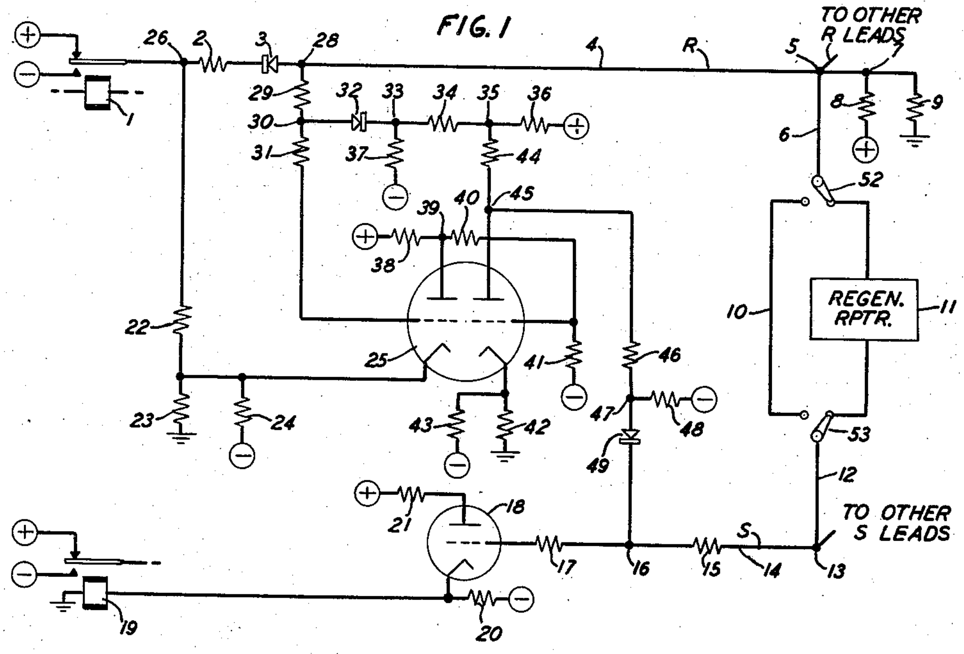

This invention relates to electronic control circuits and more particularly to an electronic control circuit applied in a direct current telegraph repeater hub circuit. Telegraph repeater hub circuits are well known in the art. They are described for instance in Patent 2,056,277 issued October 3, 1936, to F. S. Kinkead, Patent 2,069,224 issued February 2, 1937, to G. C. Cummings and Patent 2,392,339 issued January 8, 1946, to W. T. Rea. In hub-type repeaters a number of individual direct-current telegraph repeaters, such as ten repeaters, are interconnected to a common hub and any repeater in the system may transmit at any one time through the hub to all of the other repeaters simultaneously. Of the foregoing, Patent 2,392,339 discloses an arrangement wherein a single regenerative repeater may serve all of the repeaters interconnected to the hub. All of the foregoing repeaters employ magnetic relays to perform the control function by which is meant the locking and unlocking of the sending leg of the individual repeaters at the proper times to properly control the direction of transmission. The magnetic relays employed are required to be very fast in operation and polar relays have been found most satisfactory heretofore in cases wherein magnetic relays are employed to perform the control function.

Magnetic polar relays are expensive in first cost and require considerable maintenance for proper adjustment and contact care. Hub-type repeaters are coming into widespread use and recently hub-type repeaters having electronic control circuits have been invented which, it is expected, will replace the more expensive and slower control circuits of the magnetic relay type in both those arranged for use with and without a regenerative repeater. Electronic devices in hub-type repeaters increases the sensitivity of the repeater and makes it possible to exercise the functions of transmission, directional control, and double space by-pass over a single pair of hub leads rather than three, four or more hub leads required in hub-type repeaters employing only polar relays.

Of course, it is desirable in the interest of economy that the various control functions be performed with as few electronic tubes as possible. One of the most important difficulties encountered in the provision of an effective control circuit for a hub-type repeater having few tubes is the obtaining of adequate potential changes for application on their input circuits in response to the various conditions imposed on the receiving hub so that the electronic control circuit may perform its various functions.

The hub-type repeater of the present invention includes an electronic control circuit having a small number of tubes in which the normal voltage swings obtainable for the various conditions imposed on the receiving hub are increased through the introduction of a non-linear resistance at a strategic point in the control circuit. The use of non-linear resistances at another strategic point increases the normal voltage swings obtainable for the various conditions imposed on the sending leg.

Although the electronic control circuit herein is incorporated in a hub-type repeater and the non-linear resistance element is arranged in such manner as to obtain increased voltage swings for the various conditions applied to the hub, it is particularly pointed out that the principle of the invention is widely applicable to electronic circuits generally and will doubtless find employment widely in other electronic controls.

Figure 2:
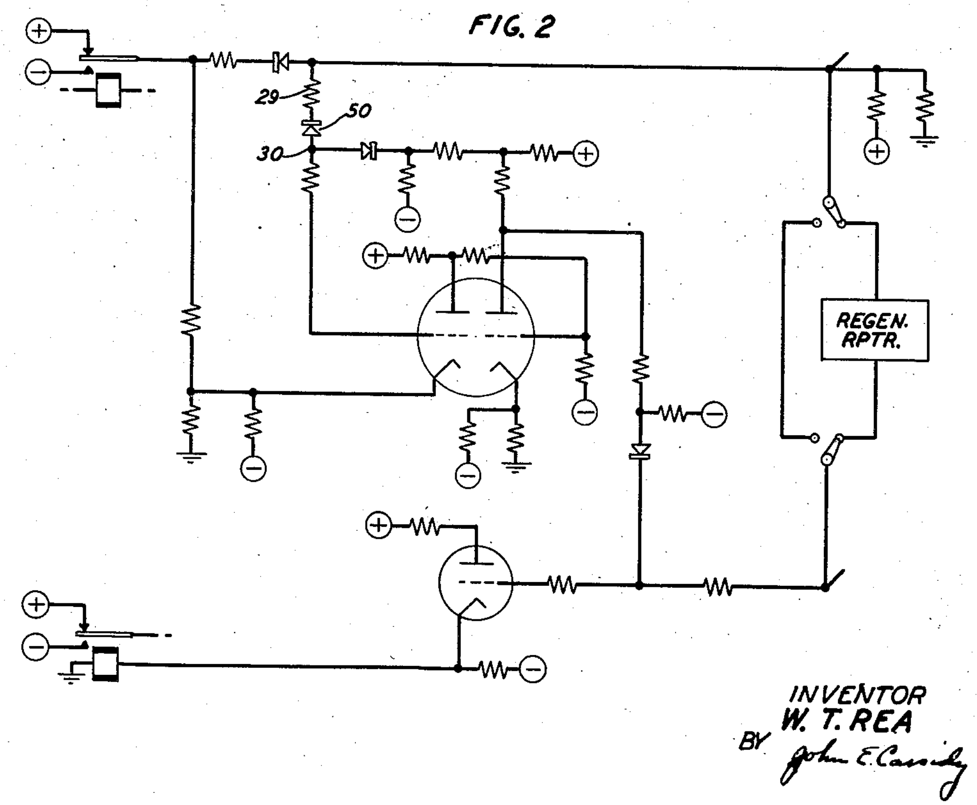

The invention may be understood from reference to the following description when read with reference to the associated drawing in which:

Fig. 1 shows the improved electronic hub repeater control circuit of the invention; and Fig. 2 shows a second embodiment of the invention.

Refer now to Fig. 1. Fig. 1 shows at the top a horizontal path which is an individual receiving leg and at the bottom a horizontal path which is an individual sending leg of a single repeater. The individual receiving leg and the individual sending leg are connected at the right through a vertical connection to the junction between two resistances whose outer terminals are connected between battery and ground. Switches 52 and 53 may be operated to engage their right-hand or left-hand contacts depending upon whether the regenerative repeater is or is not to be employed. The vertical connection may be considered to be the common hub. A number of other individual receiving legs and a corresponding number of other sending legs, nine of each, for instance, not shown, may be connected to the common hub. Interconnecting the receiving and sending paths of the single repeater shown is a network of resistances, dry rectifiers and a double triode vacuum tube arranged in an improved flip-flop control circuit. The function of this interconnecting network is to control transmission between the branches of the network in a manner to be described. Each of the other individual pairs of legs of the repeaters assumed to be connected into the hub circuit concentration, not shown, will be interconnected individually in the same manner by its own individual control circuit. Each receiving relay, such as relay 1 and each sending relay such as relay 19 are associated with a telegraph line or loop.

The network is arranged in such manner that signals incoming to any one of the circuits from its individual receiving leg can be repeated to all of the other circuits simultaneously. The network also includes means whereby signals incoming to a particular circuit from its associated individual receiving leg will not be repeated back over the associated sending leg to the same line. The network includes also arrangements whereby if telegraph signals are being received over a particular receiving leg and simultaneously signals are received from a second receiving leg connected to the hub, said signals will be impressed on all sending legs connected to the hub.

The signals are received from a particular line by means of a receiving relay, such as relay 1, which actuates an armature between its upper or marking contact and lower or spacing contact in response to impulses incoming from its associated line and impressed on its winding. The armature of relay 1 is connected through resistance 2, a dry rectifier 3 and conductor 4 to junction point 5 of hub section 6 which is connected to the junction 7 between resistances 8 and 9 which resistances are connected in series between positive battery and ground. Other receiving conductors similar to conductor 4 extend from junction 5 through similar receiving branches individually to other armatures of other receiving relays similar to relay 1. Section 6 of the hub may be connected alternatively directly through branch 10 or regenerative repeater 11, and then through section 12 of the hub to the sending junction 13, to which all sending legs of all circuits in the hub system are connected. From junction 13 the sending leg of the individual circuit shown extends through conductor 14, resistance 15, junction 16 and resistance 17 to the grid of vacuum tube triode 18. The cathode of triode 18 is connected through the winding of sending relay 19 to ground and through resistance 20 to negative battery in parallel. Positive battery is connected through resistance 21 to the anode of triode 18.

The armature of receiving relay 1 is connected from junction 26 through resistance 22 to parallel branches. One branch extends through resistance 23 to ground. A second branch extends through resistance 24 to negative battery and a third branch to the left-hand cathode of double triode 25. Positive battery is connected through resistance 38 to the left-hand anode of double triode 25. From junction 39 in the anode circuit of the left-hand triode 25 a circuit extends through resistance 40 to parallel branches. One branch connects to the grid of the right-hand triode of tube 25 and a second branch extends through resistance 41 to negative battery. The cathode of the right-hand triode of tube 25 is connected to the junction between grounded resistance 42 and resistance 43 which is connected to negative battery. From junction 28 in receiving leg 4 a path extends through resistances 29 and 31 to the grid of the left-hand triode of double triode 25. Junction 30, between resistance 29 and 31, is connected through dry rectifier 32 and resistances 34 and 36 to positive battery. Negative battery is connected through resistance 37 to junction 33 between rectifier 32 and resistance 34. From terminal 35 between resistances 34 and 36 a path extends through resistance 44 to the anode of the right-hand triode of tube 25. From junction 45 between resistance 44 and the anode of the right-hand triode of tube 25 a path extends through resistance 46 and dry rectifier 49 to junction 16 between resistances 15 and 17. Negative battery is connected through resistance 48 to junction 47 between resistance 46 and dry rectifier 49.

As mentioned above, a regenerative repeater may be connected between sections 6 and 12 of the hub by actuating switches 52 and 53 to the right as shown. The regenerative repeater may for instance be in accordance with that described in detail in Patent 2,105,173 to Walter J. Zenner et al., January 11, 1938, which patent is made part of the present disclosure as though set forth fully herein. It is pointed out that when a regenerative repeater is used a delay is introduced by the regenerative repeater between the reception of any pulse over one of the receiving legs connected to junction 5 and the retransmission of the pulse over the sending leads such as 14 after regeneration. The delay introduced is approximately equal in duration to one-half the duration of a standard pulse length.

Double triode tube 25 and its associated connections as mentioned above are arranged herein as an improved flip-flop control circuit. Generally speaking a flip-flop circuit is a vacuum tube circuit which may for instance comprise essentially two individual triodes, or a double triode, having the input and output circuits thereof mutually interconnected, so that when one is conditioned to conduct the other is responsively prevented from conducting and vice versa. The modification in the present circuit consists essentially of the introduction of the dry rectifier 32 into the feedback circuit interconnecting the anode of the right-hand section of the double triode to the grid of the left-hand section. The voltage conditions applied to the circuit including the dry rectifier are such that under one condition the rectifier is effective to open the feedback circuit, so that the voltage condition of the right-hand anode is not effective to control the grid of the left-hand triode. This will be explained more in detail hereinafter.

The individual repeater which is illustrated is shown in the marking condition. All other repeaters, not shown but assumed to be connected into the system, are assumed to be in the same condition. For this condition the armatures of all receiving relays, such as the armature of relay 1, connected to the hub circuit are in engagement with their upper or marking contacts so that they are all connected to positive battery. Positive potential will be applied from the potentiometer comprising resistances 8 and 9 through the hub to the junction 13 of all sending legs, such as 14. If the regenerative repeater is used, it will be assumed that the circuit through it is arranged for the marking condition so as to impress positive potential upon the junction 13. However the potential actually applied across the input of the left-hand triode of each double triode 25 when the marking condition prevails depends upon the condition of the flip-flop control circuit in each individual repeater. The manner in which this is performed will be described hereinafter. It is pointed out at this time, however, that the flip-flop control circuit is arranged so that for one condition called the unlocked condition it exercises no effective influence on its sending leg. If the control circuit in an individual repeater is unlocked, therefore, and a marking or positive potential is applied from the hub through the sending leg, such as conductor 14, to the grid of triode 18, the triode will conduct and the effect of the current flowing through the winding of relay 19 will cause its armature to engage its upper or marking contact. While a spacing signal is impressed on the hub, the hub will be made more negative. The grids of all tubes in unlocked sending legs will be made more negative than their cathodes and these tubes will cease to conduct. Under this condition the armatures of their respective sending relays will be under the influence of negative battery through resistance 20 and the winding of each such sending relay to ground, actuating the armature of each such sending relay to engage with its spacing contact.

Before describing the manner in which the flip-flop control circuit operates in detail to perform the control functions, there will first be presented a general description of the functions it must perform to meet the operating requirements.

Ordinarily, when the system is in operation, only one receiving relay, such as relay 1, in the receiving leg of some individual repeater, will transmit toward the hub at any one time. The flip-flop control circuit individual to each repeater in the concentration other than the control circuit in the individual repeater which is at the time transmitting toward the hub must be unlocked for this condition to permit the passage of the signals through its associated sending leg. Marking and spacing signals generated in the receiving leg of the individual repeater which is transmitting toward the hub will operate the sending relay such as 19 in each unlocked leg simultaneously, retransmitting the signals over the connected lines to the distant connected stations.

In order to prevent retransmission of the signals, incoming to the individual repeater which is assumed to be at the momenet transmitting toward the hub, back through the sending leg of the same individual repeater from which they are being received, the flip-flop control circuit in that repeater must place a locking condition on its respective triode, such as triode 18, to maintain its associated sending relay such as relay 19 continuously in the marking condition during the entire interval that its own individual receiving leg is receiving. Such signals impressed from the hub on that particular sending leg will therefore have no effect.

In the event that the sending leg of a particular repeater, say repeater No. 1, has been receiving signals through the hub from the receiving leg of another repeater, say repeater No. 2, not shown, the flip-flop control circuit in repeater No. 1 must be in the unlocked condition to permit the passage of the signals. If repeater No. 2 ceases to transmit signals toward the hub and thereafter repeater No. 1 starts to transmit toward the hub, it is necessary that two control functions be performed. First, it is necessary that the flip-flop control circuit in repeater No. 1 lock its own sending leg in response to the signals generated in its own receiving leg to prevent retransmission of its own signals to its own line. Second, it is necessary that the flip-flop control circuit in repeater No. 2, which repeater was last transmitting and the flip-flop control circuit associated with which repeater was therefore locked, be unlocked so that the signals from the receiving leg of repeater No. 1 may pass freely from the hub through the sending leg of repeater No. 2.

It is to be understood of course for the conditions assumed, that since repeater No. 2 was the last to transmit, its associated flip-flop circuit was the only one which was in the locked condition when repeater No. 1 started to transmit. Therefore, the flip-flop control circuits in all other repeaters will be in the unlocked condition at this time and will be and will remain unaffected when repeater No. 1 starts to transmit.

There is one other functional requirement of the flip-flop control circuit. It must provide for the condition under which, while one receiving leg, say that in repeater No. 1, is transmitting toward the hub, the receiving leg in another repeater, say repeater No. 2, starts to transmit toward the hub. Under such circumstances, since it is impossible to transmit communication signals effectively from more than one individual repeater through the single hub to all of the other sending legs simultaneously, in order that the parties connected to all lines connected into the concentration be made aware of the attempted double transmission, the control circuits are arranged so that they are all unlocked in response to two simultaneous spacing signals transmitted toward the hub. Therefore, the sending relays in all legs, including the sending relays associated with the two receiving legs which are transmitting simultaneously are operated to the spacing condition. The reception of spacing signals at each of the stations which is simultaneously transmitting serves as an indication of the double transmitting condition since under normal conditions a marking signal exists on the sending leg of a station while it is transmitting.

It will now be assumed that the system has been idle for an interval. Under this condition the flip-flop control circuit in the particular repeater which was the last to transmit toward the hub will be in the locked condition, and the control circuits in all other repeaters in the system will be unlocked. It will be assumed that a particular repeater, say repeater A, not shown, starts to transmit through its receiving branch such as branch 4 toward the hub. The effect of this on all repeaters except A and its control circuit, which will be considered hereinafter, will now be described.

In response to the first spacing signal transmitted from the receiving leg of repeater A toward the hub the junction 5 and all receiving branches of all repeaters connected to it, including the repeater which last transmitted, are made more negative. The grids of the left-hand triodes of all control circuits in the repeaters other than repeater A are made negative with respect to their cathodes. Their left-hand triodes are therefore all placed in the non-conducting condition. Since no current flows in their output circuits, the junctions 39 are in their more positive condition under which condition the grids of the right-hand triodes are made more positive with respect to their respective cathodes, and the right-hand triodes conduct. When current flows in the output circuits of the right-hand triodes, junctions 45 are made less positive and the upper terminals of dry rectifiers 49 are made so negative with respect to junctions 16 that they become non-conducting. In such condition the flip-flop control circuits have no control over triodes 18 which are then controlled by conditions imposed by the hub on sending legs 14.

As a result of the conduction of the right-hand triodes of double triodes 25 and a consequent lowering of the potential of junctions 35 the potential at junctions 33 and 30 and the potential applied to the grids of the left-hand triodes are maintained more negative with respect to their cathodes. Rectifiers 32 conduct for this condition. The magnitudes of the resistances and of the battery voltages as well as the characteristics of the double triodes are so chosen that, as communication continues, in response to positive swings due to the succeeding marking conditions on the branches such as 4 of the repeaters under consideration, the negative change in potential due to the conduction of the right-hand triodes is dominant in its effect on the potential impressed between the grids and cathodes of the left-hand sections of double triodes 25. As a result of this, once a control circuit in a repeater is unlocked, in response to the first spacing signal impulse of normal communication signal trains, it remains unlocked, since it is unaffected by any of the marking signal impulses in the communication signal trains. So while communication continues, all of the control circuits in the repeaters other than that in repeater A remain unlocked and the signals transmitted toward the sending hub pass freely through their sending legs.

The manner in which the control circuit in a particular repeater operates to apply a locking condition to its own sending leg when it starts to transmit toward the hub while all other repeaters are in their unlocked condition will now be described.

When the armature of the receiving relay such as relay 1 is first actuated to its spacing contact, full negative potential is applied directly to the top terminal of resistance 22. A more positive potential exists at junction 28 which is applied through resistances 29 and 31 to the grid of the left-hand triode. The grid of the left-hand triode is therefore more positive than its cathode and the left-hand triode conducts. This in turn cuts off the right-hand triode, making the potential applied through resistance 46 and rectifier 49 sufficiently positive so that the grid of triode 18 is made more positive than its cathode and triode 18 is maintained in the conducting condition in turn maintaining relay 19 in the marking condition.

The spacing signal on the receiving hub causes the potential of junction 30 and of the grid of the left-hand triode to swing sufficiently negative that rectifier 32 ceases to conduct even if the right-hand triode were in a conducting condition at the time the negative swing occurred. Hence the feed back path from the plate of the right-hand triode to the grid of the left-hand triode is effectively opened at this time. This is one of the important aspects of the invention.

When the armature of relay 1 returns to the marking condition in response to the marking signal impulses in the communication signal train the grid of the left-hand triode will be maintained more positive than its cathode so that the locking condition applied to its sending leg will be maintained and the sending leg will be unaffected by communication signal impulses impressed on it from the hub. Therefore communication signals originating in the receiving leg of any repeater cannot be repeated back over its own sending leg.

When the receiving leg of one repeater is transmitting toward the hub and the receiving leg of a second repeater starts to transmit toward the hub also, the hub will be made more negative than when a single spacing signal is impressed on it. Under this condition the potential of the grids of all of the left-hand triodes will be negative with respect to their cathodes. This will unlock every control circuit and transmit a spacing signal over the sending legs of all repeaters in the system including the two which are transmitting simultaneously toward the hub, the sending legs of which two repeaters would ordinarily be in the marking condition if but one were transmitting. This serves as an indication of the attempted double transmission.

Attention is particularly directed to the function performed by the dry rectifier 32 which is one of the important aspects of the present invention. If rectifier 32 were not used the ratio of the resistances coupling the grid of the left-hand triode of double triode 25 to the receiving hub and to the plate of the right-hand triode would be required to be such as to produce a maximum voltage swing at the grid of the left-hand triode when:

1. The right-hand triode changes from the locked to the unlocked condition with a marking signal on the receiving hub;

2. The right-hand triode changes from the unlocked to the locked condition with the receiving hub changing simultaneously from the space to the double space condition.

As the resistance ratio is changed, one of these swings will increase and the other decrease. Hence the maximum swing would be obtained at a resistance ratio making the two swings equal. The magnitude of the maximum swing obtainable would, however, be too small to be practicable for overriding voltage and resistance variations.

When the rectifier 32 is employed, it presents a low resistance during the marking condition on the receiving hub for the unlocked condition. The resistance ratio is then such as to place the voltage applied to the grid of the left-hand triode close to that of the plate of the right-hand triode so that it is greatly affected by the plate swing. When the receiving hub is in the space or double space condition rectifier 32 presents a high resistance, thus effectively changing the grid of the left-hand triode so that it is more directly influenced by the voltage swing of the receiving hub for the space and double space conditions. As a result of this, the voltage swing obtainable at the grid of the left-hand triode may be increased about two-fold over that obtainable without rectifier 32.

Tube 25 in Figs. 1 and 2 may be, for instance, a Western Electric Company, Incorporated Code 396A tube. The positive and negative potentials indicated in Figs. 1 and 2, in a representative case, may be 120 volts respectively, in each intance, except that the magnitude of the negative potential shown connected through resistance 37, which is employed with resistance 37, to center the voltage swing of terminal 33 with respect to terminal 28, is required to be of a value to perform this centering function. If this voltage swing is centered, resistance 37 and the negative potential connected to its lower terminal may be omitted. Assuming the foregoing, and assuming the voltage swing is centered, the following is a representative and operable set of resistance values for the arrangements per Fig. 1 and Fig. 2:

| Resistance Number | Resistance Magnitude |
|---|---|
| 2 | 2,000 ohms. |
| 8 | 18,000 ohms. |
| 9 | 18,000 ohms. |
| 15 | 2 megohms. |
| 17 | 2 megohms. |
| 20 | 17,000 ohms. |
| 21 | 2,500 ohms. |
| 22 | 6,000 ohms. |
| 23 | 6,400 ohms. |
| 24 | 32,000 ohms. |
| 29 | 10 ohms. |
| 31 | 2 megohms. |
| 34 | 10 ohms. |
| 36 | .2 megohm. |
| 38 | .5 megohm. |
| 40 | 3.2 megohms. |
| 41 | 2.4 megohms. |
| 42 | 2,800 ohms. |
| 43 | 7,100 ohms. |
| 44 | 10 ohms. |
| 46 | .56 megohm. |
| 48 | 1.6 megohms. |

Refer now to Fig. 2. In this embodiment of the invention the principle of the increased voltage swing obtainable through the incorporation of a dry rectifier in the interconnection of the feedback and grid circuits of one of the tubes of a flip-flop control circuit is further extended by the addition of the dry rectifier 50 between resistance 29 and junction 30. The dry rectifier 50 is so poled as to present a high resistance when positive battery is applied to the receiving hub for the marking condition and a low resistance for the space and double space condition. By this means the grid of the left-hand triode is in effect moved very near to the receiving hub for the latter condition. Thus a further improvement in the magnitude of the grid swing results. Assuming the resistance and potential values of the foregoing as a representative operable set, the following table shows the potentials at the points indicated for the various conditions in Fig. 2:

spacing the instantaneous conditions become as shown in column V. It will be noted that these are unstable, since although the locking circuit is assumed released, the grid voltage of the right-hand triode with respect to its cathode is negative. The circuit, therefore, changes instantly to the stable condition shown in column VI with the locking circuit held.

When now some other receiving leg becomes spacing, the hub will assume the double-space condition and the instantaneous conditions will become as shown in column VII. This condition is unstable because although the locking circuit is assumed held, the grid voltage of the right-hand triode with respect to its cathode is positive. The circuit, therefore, changes instantly to the stable condition shown in column VIII with the locking circuit released.

The minimum grid to cathode potential swings afforded by the arrangement of Fig. 1 in which the single rectifier is employed is an improvement over a circuit which does not employe the rectifier. The minimum grid to cathode potential swings afforded by the arrangement of Fig. 2 employing two rectifiers, as indicated by the above table, are substantial and represent a further improvement over that obtainable by the arrangement in Fig. 1.

What is claimed is:

1. In a communication system, a first and a second main transmission branch, a two tube flip-flop circuit, an input circuit for one of said tubes connected directly to said first branch, an output circuit having a first and a second path connected to the other of said tubes, said first path connected to the input of said first tube, a dry rectifier in said first path, said second path connected directly to said second transmission branch so as to control transmission through said second branch in response to voltage conditions imposed on said first branch.

2. A communication system in accordance with claim 1 having a dry rectifier in said second path.

*Voltage conditions in Fig. 2*

| | Column | | | | | | | |
|---|---|---|---|---|---|---|---|---|
| | I | II[1] | III | IV | V[1] | VI | VII[1] | VIII |
| Relay 1 | M | M | M | M | S | S | S | S |
| Rec Hub | M | S | S | M | S | S | DS | DS |
| Condition of locking circuit | Held | Held | Rls'd | Rls'd | Rls'd | Held | Held | Rls'd |
| Terminal 26 | +120 | +120 | +120 | +120 | −120 | −120 | −120 | −120 |
| Terminals 28 and 5 | +60 | −30 | −30 | +60 | −30 | −30 | −60 | −60 |
| Left-hand triode of 25: | | | | | | | | |
| Cathode | +17 | +15 | +15 | +15 | −43 | −43 | −45 | −45 |
| Terminal 30 | +60 | −30 | −30 | 0 | −30 | −30 | −60 | −60 |
| Terminal 39 | +47 | +100 | +100 | +100 | −11 | −11 | +100 | +100 |
| Right-hand triode of 25: | | | | | | | | |
| Cathode | −34 | −34 | −33 | −33 | −33 | −34 | −34 | −33 |
| Grid | −49 | −26 | −26 | −26 | −74 | −74 | −26 | −26 |
| Terminal 35 | +100 | +100 | 0 | 0 | 0 | +100 | +100 | 0 |
| Terminal 47 | +46 | +46 | −30 | −30 | −30 | +46 | +46 | −30 |

[1] Denotes unstable condition.

In the foregoing table column I shows the conditions that exist when relay 1 is marking, the hub is marking and the locking circuit is held. When the hub goes spacing the instantaneous conditions become as shown in column II. It will be noted that these are unstable, since, although the locking circuit is assumed held, the grid voltage of the right-hand triode with respect to its cathode is positive. The circuit, therefore, changes instantly to the stable condition shown in column III with the locking circuit released.

Column IV shows the conditions that exist when relay 1 is marking, the hub is marking and the locking circuit is released. When relay 1 goes 3. In a hub-type telegraph repeater system, a receiving hub, a sending hub, a plurality of individual telegraph repeaters, a receiving leg and a sending leg, distinct from said receiving leg, in each of said repeaters, each of said receiving legs connected directly to said receiving hub, each of said sending legs connected directly to said sending hub, said hubs connectable directly at a first time, said hubs connectable through a regenerative repeater at a second time, an individual electronic control circuit interconnecting the receiving leg and the sending leg in each of said individual repeaters, two space discharge devices in each of said control circuits, each of said control circuits devoid of another discharge device, a third space discharge device in each of said sending legs, means in each of said individual repeaters and in said hubs for receiving telegraph signals from the receiving leg of any one of said individual repeaters and transmitting said signals through said receiving hub, directly through said sending hub and through said sending legs of all of the others of said individual repeaters simultaneously at said first time, means for transmitting said received signals through said receiving hub, through said regenerative repeater and through said sending legs of all of the others of said individual repeaters simultaneously at said second time, means including said discharge devices, in the control circuit of the one individual repeater from which said signals are being received for preventing their retransmission through the sending leg of the same individual repeater from which they are being received at said first time and at said second time and interconnecting circuits between said two space discharge devices in each control circuit and its respective receiving leg to discriminate between a single space and a double space condition.

4. A hub-type telegraph repeater system in accordance with claim 3 in which each of said control circuits has a polarity sensitive resistance element.

5. A hub-type telegraph repeater system in accordance with claim 3 including means in said control circuits responsive to the simultaneous existence of more than one spacing signal on said receiving hub for transmitting a spacing signal simultaneously over all of said sending legs.

6. In a hub telegraph repeater system, a receiving hub, a sending hub, a plurality of individual hub type telegraph repeaters, an individual receiving leg in each of said repeaters connected directly to said receiving hub, an individual sending leg in each of said repeaters connected directly to said sending hub, an individual space discharge device in each of said sending legs, a regenerative repeater, said hubs interconnectable through said regenerative repeater, an individual electronic control circuit for each of said repeaters interconnecting said receiving leg to said sending leg in each individual repeater, each said control circuit having two space discharge devices and devoid of any other space discharge device, said two devices having interconnections to form a flip-flop circuit, said interconnections comprising a first and a second input branch for the first of said two devices in each control circuit, said first branch connected to said receiving hub through its repective receiving leg, said second branch connected to the output of the second of said devices in its respective control circuit, said first branch and said second branch interconnected directly, a first dry rectifier in each said second branch, and an output branch from said second of said devices in each control circuit connected to said space discharge device in its respective sending leg, a telegraph signal repeater connected to each receiving leg, the operation of two of said repeaters simultaneously producing an abnormal condition on said receiving hub, said input circuits discriminating between said abnormal condition and a normal telegraph signaling condition.

7. A hub telegraph repeater system in accordance with the last preceding claim, having a second dry rectifier in said first branch, the polarity of said second dry rectifier reversed with respect to the polarity of said first dry rectifier.

8. A hub telegraph repeater system in accordance with the penultimate claim having a third dry rectifier in said output branch from said devices to its respective sending leg.

9. In a telegraph system, a telegraph repeater, a sending leg and a receiving leg in said repeater, a control circuit connected between said legs, a first and a second space discharge device in said control circuit, a plate of said first device connected to a grid of said second device to control the activation of said second device in response to the activation of said first device, another connection between said second device and said first device to control the activation of said first device in response to the activation of said second device, a third device in said sending leg and a connection between one of said devices in said control circuit and a grid of said third device to control transmission through said sending leg in response to the condition of said one device.

10. In a telegraph system, a telegraph repeater, a receiving leg and a sending leg in said repeater, an electronic control circuit in said repeater, two space discharge devices in said control circuit, elements of said devices interconnected so that each of said devices exercises activation control over the other, activation connections between said receiving leg and said discharge devices, and a control connection between said devices and said sending leg.

11. In a telegraph system, a telegraph repeater, an electronc control circuit in said repeater, two space discharge devices in said control circuit, mutual activation controls between said devices, a receiving and a sending leg in said repeater, a plurality of connections between said devices and said receiving leg, at least three differing potentials applicable between said receiving leg and said devices, a control connection between an output of one of said devices and said sending leg subject to the imposition of two differing potentials in response to the imposition of said potentials on said devices by said receiving leg.

12. In a telegraph system, a hub telegraph repeater, a receiving leg and a sending leg in said repeater each connected to a hub, a control circuit in said repeater, a first and a second electronic device in said control circuit, an activation control connection between said receiving leg and said first device, an activation control connection between said first device and said second device, a locking potential connection between said second device and said first device to prevent change in the condition of said first device due to the application of a particular potential condition through said connection between said receiving leg and said first device when said second device is in a particular condition, and a control connection between said electronic devices and said sending leg responsive to the condition of said control circuit.

WILTON T. REA.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,347,813 | Cummings | May 2, 1944 |
| 2,366,076 | Wilbur | Dec. 26, 1944 |
| 2,432,188 | Bliss | Dec. 9, 1947 |
| 2,441,006 | Canfora | May 4, 1948 |

FOREIGN PATENTS

| Number | Country | Date |
|---|---|---|
| 356,111 | Great Britain | Aug. 24, 1931 |